United States Patent [19]

Kojima et al.

[11] Patent Number: 5,589,116
[45] Date of Patent: Dec. 31, 1996

[54] PROCESS FOR PREPARING A SILICON CARBIDE SINTERED BODY FOR USE IN SEMICONDUCTOR EQUIPMENT

[75] Inventors: Shoichi Kojima, Tokyo; Kazuhiro Minagawa, Amagasaki; Haruyuki Kano, Ibaraki-ken; Tadaaki Miyazaki, Higashi-Yamato; Hiroaki Wada, Kawasaki, all of Japan

[73] Assignee: Sumitomo Metal Industries, Ltd., Tokyo, Japan

[21] Appl. No.: 181,945

[22] Filed: Jan. 18, 1994

Related U.S. Application Data

[63] Continuation-in-part of Ser. No. 913,951, Jul. 17, 1992, Pat. No. 5,318,761.

[30] Foreign Application Priority Data

Jul. 18, 1991 [JP] Japan ............................ 3-178389
Jan. 18, 1993 [JP] Japan ............................ 5-006264

[51] Int. Cl.$^6$ ........................ C04B 35/54; C04B 35/56
[52] U.S. Cl. ........................ 264/65; 264/60; 264/66; 423/345; 427/228; 427/399; 501/88; 501/89
[58] Field of Search .................. 264/60, 65, 66; 501/88, 89; 423/345; 427/228, 399

[56] References Cited

U.S. PATENT DOCUMENTS

| | | | |
|---|---|---|---|
| 4,110,386 | 8/1978 | Yajima et al. | 264/29.5 |
| 4,529,575 | 7/1985 | Enomoto et al. | 423/345 |
| 4,571,331 | 2/1986 | Endou et al. | 423/345 |
| 4,610,858 | 9/1986 | Yamada et al. | 423/342 |
| 4,619,798 | 10/1986 | Tanaka et al. | 264/62 |
| 4,702,900 | 10/1987 | Kurachi et al. | 423/345 |
| 4,795,673 | 1/1989 | Frechette et al. | 428/331 |
| 5,093,039 | 3/1992 | Kijima et al. | 252/516 |
| 5,179,049 | 1/1993 | Numata et al. | 501/88 |
| 5,318,761 | 6/1994 | Kojima et al. | 423/345 |

FOREIGN PATENT DOCUMENTS 0165554 12/1985 European Pat. Off. .

*Primary Examiner*—Christopher A. Fiorilla
*Attorney, Agent, or Firm*—Burns, Doane, Swecker & Mathis, LLP

[57] ABSTRACT

A process for the preparation of a silicon carbide sintered body of high purity which has a content of 1 ppm or less of each atom harmful to the manufacture of semiconductor equipment including the step of shaping a silicon carbide powder, calcining the shaped body in a non-oxidizing atmosphere to form a porous body, and subjecting the porous body to reaction sintering while being impregnated with molten metallic silicon. The starting silicon carbide powder also has a content of 1 ppm or less of each harmful atom and it has a free carbon content of not greater than 20% by weight and an average particle diameter of 0.5–20 μm. Such silicon carbide powder can be prepared from a carbon- and silicon-containing starting mixture including at least one liquid hydrolyzable silicon compound and at least one carbonaceous material selected from polymerizable or cross-linkable organic compounds prepared in the presence of a catalyst which is substantially free from harmful atoms by solidifying the starting mixture and heating it so as to react and form silicon carbide.

24 Claims, No Drawings

PROCESS FOR PREPARING A SILICON CARBIDE SINTERED BODY FOR USE IN SEMICONDUCTOR EQUIPMENT

This application is a continuation-in-part of U.S. application Ser. No. 07/913,951, filed on Jul. 17, 1992, now U.S. Pat. No. 5,318,761.

BACKGROUND OF THE INVENTION

The present invention relates to a process for preparing a silicon carbide sintered body having a purity sufficient for its use in equipment for manufacturing semiconductor devices (hereinafter merely referred to as "semiconductor equipment").

Semiconductor equipment is used to carry or handle silicon wafers or similar substrates or shield them from air in the manufacture of semiconductor devices such as integrated circuits.

One type of semiconductor equipment is mainly used during heat treatment steps at high temperatures such as oxidation, CVD, PVD, SOI (silicon on insulator), or thermal diffusion of an impurity as a dopant. Such semiconductor equipment includes wafer carriers (called boats) such as wafer boats, mother boats, and vertical boats as well as tubes and other parts such as process tubes, liner tubes, and forks. Another type of semiconductor equipment is used for securing and positioning and includes hands, vacuum chucks, bell jars, and spacers.

Semiconductor equipment which has conventionally been used is usually made of quartz glass (fused silica) or silicon. Semiconductor equipment made of quartz glass is susceptible to deformation or distortion during heat treatment since quartz glass has a relatively low softening point in the vicinity of 1100° C. Furthermore, when kept at a high temperature for a prolonged period, quartz glass may become devitrified and broken due to phase transition into α-cristobalite. Therefore, when used for heat treatment, such semiconductor equipment has a quite limited service life under the conditions existing during heat treatment at high temperatures.

Semiconductor equipment made of silicon has problems which should be eliminated from an industrial viewpoint, including low toughness which places many restrictions on fabrication of the equipment.

Silicon carbide (SiC) is chemically stable and resistant to corrosion at high temperatures and its strength and stiffness are much higher than those of quartz glass. In view of these properties, semiconductor equipment made of sintered silicon carbide is sometimes used. However, such semiconductor equipment is rarely used in processing of silicon wafers of high quality, which are sensitive to metallic impurities, since presently available silicon carbide of high purity still contains a considerable amount of metallic impurities. These impurities often evaporate during thermal diffusion treatment, generating gases that cause contamination of wafers.

Accordingly, there is a need for pure silicon carbide powder that is substantially free from metallic impurities, i.e., with a content of 1 ppm or less for each metallic impurity, as a starting material for sintered silicon carbide.

Silicon carbide has two crystal forms, α-form (hexagonal) which is stable at higher temperatures and β-form (cubic) which is stable at lower temperatures. Of these, β-silicon carbide is more suitable for use in the manufacture of semiconductor equipment since it readily makes a more uniform and pure powder by an industrial process. Known methods for the preparation of silicon carbide powder involve (1) a reaction of $SiO_2$ with C, (2) a reaction of metallic Si with C, or (3) a vapor phase reaction of a Si compound, e.g., $SiCl_4$, with a hydrocarbon. Method (1) is used in commercial production of silicon carbide powder since the starting materials are inexpensive and the reaction can be easily controlled.

The most popular process for the preparation of silicon carbide powder using the above-described reaction (1) is the Acheson process. The Acheson process comprises reacting a siliceous material ($SiO_2$ or its precursor) and a carbonaceous material (C or its precursor) by heating a mixture of these two solid materials in powdery form in a batchwise electric-resistance furnace known as a Acheson-type furnace to produce silicon carbide in lumps.

The Acheson process has a significant drawback that the product is inevitably contaminated with a considerable amount of metallic impurities, which not only come from each of the solid starting materials, which contain an appreciable amount of impurities, but also result- from pulverization which must be performed to finely divide the silicon carbide product in lumps. The Acheson process has additional drawbacks of poor operating efficiency and a deteriorated work environment since it requires the removal of a side wall of the furnace for the recovery of the product in each reaction cycle.

In order to improve the operating efficiency, it has been proposed in Japanese Patent Publication No. 58-18325(1983) and No. 58-34405(1983) that a mixture of the powdery starting materials be shaped by use of a binder such as pitch, thereby making it possible to directly produce a β-silicon carbide powder without a pulverization step. Japanese Patent Application Kokai No. 61-6110(1986) discloses an improved continuous process for the preparation of β-silicon carbide powder which comprises preparing a starting mixture consisting of a solid siliceous material, a solid carbonaceous material, a liquid hydrolyzable silicon compound, and a curable organic compound having polymerizable or cross-linkable functional groups, preheating the starting mixture so as to cure the organic compound and solidify the mixture, and heating to allow the solidified mixture to react in a non-oxidizing atmosphere.

It is also known that a starting mixture is made uniform by using a liquid starting material in order to produce a silicon carbide powder having a uniform particle diameter or shape. For example, it is proposed in Japanese Patent Application Kokai No. 57-8019(1982) to prepare a starting mixture by treating a carbonaceous material with a silicic acid solution and heating the mixture in a non-oxidizing atmosphere. Preferably, the carbonaceous material is also a liquid substance and the mixture is prepared in a liquid state. Unfortunately, a small amount of silica sol is formed in the starting mixture and adversely affects the quality of the product. In order to eliminate this drawback, it is disclosed in Japanese Patent Publication No. 1-42886(1989) to use a mixture comprising a liquid siliceous material, a curable or polymerizable liquid organic compound capable of forming carbon upon heating, and a polymerization or curing catalyst which is compatible with the liquid organic compound to form a homogeneous solution. The mixture is made to react to form a cured body containing Si, O, and C as an SiC precursor, which is then heated in a non-oxidizing atmosphere to give a β-silicon carbide powder.

However, in the above-described prior-art processes for preparation of silicon carbide powder, it is difficult or impossible to produce a silicon carbide powder of high purity having a content of 1 ppm or less for each metallic impurity, a purity level which is acceptable in the manufacture of semiconductor equipment. Therefore, silicon carbide powders obtained in these processes are always contaminated with metallic impurities in considerable amounts, e.g., on the order of 3 ppm or more for one or more impurity metals, and this level of contamination is not acceptable in semiconductor equipment. Although washing is an effective means for removing impurities, it is quite difficult in a commercial process to decrease an impurity level to 1 ppm or less by washing. As a result, a sintered body prepared from a silicon carbide powder made by prior-art methods will not have a desired level of impurity content of 1 ppm or less for each metallic impurity.

SUMMARY OF THE INVENTION

It is an object of the present invention to provide a process for preparing a silicon carbide sintered body sufficiently pure for use in the manufacture of semiconductor equipment.

A more specific object of the invention is to provide a process for preparing a silicon carbide sintered body having an impurity content of 1 ppm or less of each metallic impurity known to be harmful in the manufacture of semiconductor devices.

The present invention provides a process for the preparation of a silicon carbide sintered body suitable for use in the manufacture of semiconductor equipment comprising the steps of shaping a silicon carbide powder, calcining the shaped body in a non-oxidizing atmosphere to form a porous body, and subjecting the porous body to reaction sintering while being impregnated with molten metallic silicon, wherein the silicon carbide powder has an average particle diameter of about 0.5–20 μm, a free carbon content of not greater than about 20% by weight, and a content of 1 ppm or less for each of alkali metal, alkaline earth metal, B, Al, and Ga, and heavy metal atoms which are harmful to the manufacture of semiconductor devices.

The silicon carbide powder used as a starting material in the above-described process can be prepared by a method which is herein referred to as "high-purity precursor method" and which comprises preparing a carbon- and silicon-containing starting mixture comprising (a) at least one siliceous material selected from liquid hydrolyzable silicon compounds and solid siliceous substances derived from a hydrolyzable silicon compound, and (b) at least one carbonaceous material selected from polymerizable or cross-linkable organic compounds prepared in the presence of a catalyst which is substantially free from atoms harmful to the manufacture of semiconductor devices, at least one material used as component (a) or (b) being a liquid substance; solidifying the starting mixture by heating, by use of a catalyst or a curing agent, or by a combination of these, and heating to produce a chemical reaction in the resulting solid body in a non-oxidizing atmosphere at a temperature sufficient to give silicon carbide powder.

Specific examples of atoms harmful to the manufacture of semiconductor devices (hereinafter referred to as "harmful atoms") include alkali metal atoms such as Na and K; alkaline earth metal atoms such as Be, Mg, and Ca; metal atoms such as B, Al, and Ga; and heavy metal atoms such as Fe, Ni, Cu, Cr, V, and W. These atoms can be incorporated in silicon wafers by vaporization, e.g., in the form of chlorides, during heat treatment of the wafers, thereby deteriorating the insulation resistance of the wafers or the dielectric strength of an $SiO_2$ film formed thereon.

According to the process of the present invention, a silicon carbide sintered body of high purity which has a structure consisting of about 50%–80% by weight of silicon carbide matrix phase, about 0%–30% by weight of reacted silicon carbide phase, and about 0%–40% by weight of metallic silicon phase and which has a content of 1 ppm or less of each harmful atom in all the phases can be produced using a silicon carbide powder obtained by the above-described high-purity precursor method by merely taking precaution to minimize incorporation of impurities from the surrounding environment or by performing a purification procedure such as washing or heat treatment in an inert atmosphere, in vacuum, or in a hydrogen halide gas.

DETAILED DESCRIPTION OF THE INVENTION

It was found that most of the metallic impurities found in a silicon carbide powder come from the carbonaceous starting material. Siliceous starting materials can be readily purified by a method suitable for a commercial process so that highly pu e siliceous materials which arc substantially free from harmful atoms can be obtained- In contrast, organic resins such as, phenolic resins, which are suitable for use as solid carbonaceous materials, contain a considerable amount of harmful atoms originating from the catalyst used in the preparation of the resins and it is difficult to decrease the impurity level to 1 ppm or less, for example, by a commercially-available purification technique. Furthermore, carbon tends to readily adsorb metals. Therefore, harmful atoms inevitably remain in the resulting silicon carbide powder. Furthermore, in the course of preparing a sintered body from a silicon carbide powder, there is a possibility of harmful atoms incorporating into the resulting sintered body.

It has been found that a silicon carbide powder of high purity can be prepared by using an organic substance which has been made in the absence of a metallic catalyst and which is curable by polymerization or crosslinking. It has also Been found that incorporation of impurities from the environment during shaping, calcining, and sintering steps to form a sintered body can be controlled by proper precautions or by purification during or after these steps.

In accordance with the present invention, a silicon carbide powder of high purity, i.e., having a content of 1 ppm or less of each harmful atom is used as a starting material and such a silicon carbide powder can be prepared by the high-purity precursor method in which a curable organic substance made in the absence of a metallic catalyst is used as a carbon source.

The starting mixture used in the high-purity precursor method is a mixture comprising (a) at least one siliceous material selected from liquid hydrolyzable silicon compounds and solid siliceous substances derived from a hydrolyzable silicon compound, and (b, at least one carbonaceous material selected from polymerizable or cross-linkable organic compounds prepared in the presence of a catalyst which is substantially free from harmful atoms. At least one liquid substance is used as component (a) or (b) in the starting mixture. In order to assure the preparation of the desired silicon carbide powder having a content of 1 ppm or less of each harmful atom, it is preferable to control the content of each harmful atom to 1 ppm or less in all the siliceous and carbonaceous starting materials used.

Liquid hydrolyzable silicon compounds useful as component (a) in the starting mixture include (1) a class of polymers prepared by tri-methylation of a hydrolyzable silicic acid derivative (e.g., silicon tetrachloride) and (2) esters prepared by a reaction of a hydrolyzable silicic acid derivative with a monohydric alcohol or a polyhydric alcohol such as a diol or triol (e.g., an alkyl silicate such as ethyl silicate prepared by a reaction of silicon tetrachloride with ethanol). It is preferred that the liquid hydrolyzable silicon compounds have a content of 1 ppm or less for each harmful atom by using reactants which are free of harmful atoms and optionally a catalyst which is also free of harmful atoms in the preparation of the silicon compounds.

Similarly, it is preferred that the solid siliceous substances derived from a hydrolyzable silicon compound which are also useful as component (a) in the starting mixture have a content of 1 ppm or less of each harmful atom. Any solid siliceous substance capable of reacting with carbon at a high temperature in a non-oxidizing atmosphere to form silicon carbide can be used. A preferred example of such a solid siliceous substance is fine powder of amorphous silica which is derived from silicon tetrachloride by hydrolysis.

Component (b) is at least one organic curable compound which is capable of polymerizing or cross-linking by heating and/or with the aid of a catalyst to form a cured high polymer and which is a monomer, oligomer, or polymer prepared in the presence of a catalyst that is substantially free from harmful atoms. Preferred examples of such an organic compound are thermosetting resins such as phenolic resins, furan resins, urea resins, epoxy resins, unsaturated polyester resins, polyimide resins, and polyurethane resins prepared in the presence of a catalyst free of harmful atoms. Among others, phenolic resins which are either resol or novolak resins are particularly preferred due to their high degree of carbon retention and good handling properties.

Useful resol resins can be prepared by reacting a monohydric or dihydric phenol such as phenol, cresol, xylenol, resorcinol, or bisphenol-A with an aldehyde such as formaldehyde, acetaldehyde, or benzaldehyde in the presence of ammonia or an organic amine as a catalyst free from harmful atoms. Common resol resins are prepared by use of an alkali metal compound as a catalyst and contain one or more harmful atoms at a concentration of more than 1 ppm, so they are not suitable for use in the present invention as a starting material.

Organic amines that can be used as a catalyst free from harmful atoms include primary, secondary, and tertiary amines. Specific examples of useful amines include dimethylamine, trimethylamine, diethylamine, triethylamine, dimethylmonoethanolamine, monomethyldiethanolamine, N-methylaniline, pyridine, and morpholine. The preparation of a resol resin in the presence of ammonia or an organic amine as a catalyst can be performed in a conventional manner except for the use of a different catalyst, such as by adding from 1 to 3 moles of an aldehyde and from 0.02 to 0.2 moles of ammonia or an organic amine to each mole of a phenol and heating the mixture at 60–100° C.

Useful novolak resins can be prepared from a monohydric or dihydric phenol and an aldehyde, which are the same reactants as used in the preparation of resol resins, but using in addition an inorganic or organic acid free from harmful atoms as a catalyst. Examples of such an acid catalyst include hydrochloric acid, sulfuric acid, p-toluenesulfonic acid, and oxalic acid. The preparation of these novolak resins can be performed in a conventional manner, such as by adding from 0.5 to 0.9 moles of an aldehyde and from 0.02 to 0.2 moles of an inorganic or organic acid free from harmful atoms to each mole of a phenol and heating the mixture at 60°–100 ° C.

At least one of siliceous component (a) and carbonaceous component (b) used in the starting mixture is a liquid substance. Preferably all the components are liquid substances. For example, a liquid hydrolyzable silicon compound is used as component (a) and/or a liquid resin such as a liquid resol-type phenolic resin is used as component (b). When a solid substance such as a novolak-type phenolic resin is used, it may be used in liquid form by dissolving it in an appropriate organic solvent. If all the components constituting the starting mixture are solid substances, it is difficult to mix the components uniformly and the resulting silicon carbide powder has poor uniformity with respect to particle diameter and shape.

The starting mixture for the preparation of silicon carbide is prepared by admixing at least one component (a) (siliceous material) with at least one component (b) (carbonaceous material), and a polymerization or curing catalyst or a cross-linking agent is added to the mixture, if necessary. When component (b) is a liquid substance such as a resol resin, a uniform starting mixture can be obtained by mixing components (a) and (b) preferably under thorough stirring. When component (b) is a solid substance such as a novolak resin, it is preferred to dissolve the solid component (b) in an appropriate solvent, e.g., an alcohol for a novolak resin and admix the resulting solution with component (a) preferably under thorough stirring.

When the organic compound used as component (b) is curable merely by heating, it is not necessary to add a polymerization or curing catalyst. In most cases, a polymerization or curing catalyst or a cross-linking agent is added to the starting mixture and uniformly distributed therein by mixing. The catalyst should be a polymerization or curing catalyst which is substantially free from harmful atoms. For example, an inorganic acid such as hydrochloric acid or sulfuric acid, an organic peroxide, or an organic sulfonic acid can be used as a curing catalyst for resol resins. When a novolak resin is used as component (b), hexamethylenetetramine or a similar polyamine can be added as a cross-linking agent.

The starting mixture prepared in the above-described manner is then solidified either by allowing to stand at room temperature or by heating it so as to cure component (b) in the mixture by a polymerization or cross-linking reaction, resulting in the formation of a uniform solid body which contains Si, C, and oxygen and which serves as a silicon carbide precursor. When component (b) is a resol or novolak resin, curing of the resin usually proceeds by mere standing. When the starting mixture is heated, the heating temperature can be selected depending on the particular organic compound and catalyst or cross-linking agent used such that the temperature is sufficient to cause curing of component (b) but not sufficient to cause degradation or carbonization of the resin component (b). The heating atmosphere is not critical and may be either air or a non-oxidizing atmosphere.

The resulting solid cured body of high purity which serves as a silicon carbide precursor is then heated in a non-oxidizing atmosphere, e.g., in vacuum, nitrogen, helium, or argon, to cause carbonization and silicification reactions, resulting in the formation of the desired silicon carbide powder. The temperature for such reaction heating is usually in the range of about 160°–2000 ° C. The duration of reaction heating is usually in the range of from 30 minutes to 3 hours.

Since the average particle diameter of the resulting silicon carbide powder depends on the heating temperature, it is preferable that the heating temperature be so selected that the resulting powder has an average particle diameter in the range of 0.5–20 μm so as to make it possible to use the powder as a starting material in the process of the present invention without pulverization. For this purpose, it is preferable that the heating temperature be in the range of 1700°–1900° C.

Prior to the reaction heating, the solid cured body may be pretreated by heat treatment under conditions sufficient to remove volatiles from the solid body. Preferably the heat treatment is performed at a temperature in the range of from 500° C. to 1300° C. and more preferably in the range of 800°–1000° C. for a period sufficient to remove volatiles which are primarily present in the organic resin component (b) and which do not participate in carbonization. Such preliminary heat treatment prior to reaction heating is effective for improving the operating efficiency for some resins used as component (b) and it is preferably performed in a non-oxidizing atmosphere as exemplified above. When the resin used as component (b) does not contain a large amount of volatiles, the solid cured body can be directly subjected to reaction heating in a non-oxidizing atmosphere.

The heating rates in the preliminary heat treatment and reaction heating steps are not critical.

The proportions of the siliceous material [component (a)] and carbonaceous material [component (b)] in the starting mixture can be selected on the basis of the C/Si atomic ratio determined on a sample of the starting mixture after it is cured and the cured solid body is heat treated at a temperature in the range of 800°–1400° C. so as to form a volatile-free heat-treated mass. It is desirable to choose the proportions of components (a) and (b) such that the C/Si atomic ratio of the heat-treated mass is between 1 and 10, preferably between 2 and 6, and more preferably, approximately 3. Since part of carbon originally present in the carbonaceous material has been lost as volatiles during heat treatment, the amount of component (b) which is actually mixed with component (a) should be selected by considering the degree of carbon retention after the heat treatment. Thus, component (b) is used in an amount which is the sum of the amount determined from the C/El ratio of a heat-treated mass plus the amount corresponding to the volatility loss in the heat treatment. The purpose of the heat treatment at a temperature of 800°–1400 ° C. in a non-oxidizing atmosphere is merely to determine the C/Si ratio in a heat-treated mass for use as an indicator to select the proportions of components (a) and (b). Therefore, such heat treatment is not necessary in the actual preparation process according to the present invention, although heat treatment may optionally be applied to a solid cured body at a temperature of 500°–1300° C. prior to reaction heating, as described above.

When a solid material such as a solid hydrolyzable siliceous substance is incorporated in the starting mixture, it is preferred that the total proportion of liquid materials (including a solution of a solid material dissolved in an appropriate solvent) be at least 5% by weight based on the total weight of the starting mixture since the uniformity of the starting mixture is degraded in the presence of a liquid material in a proportion of less than 5% by weight. The total proportion of liquid materials is more preferably at least 15% and most preferably 100% by weight of the starting mixture.

The product obtained by the high-purity precursor method is β-silicon carbide in the form of a fine powder having a relatively uniform particle diameter and shape. The proportion of α-silicon carbide incorporated in the product is less than 1% by weight as determined by powder X-ray diffraction analysis. It is possible to obtain a powder product comprised solely of β-silicon carbide by proper selection of the reaction conditions. The powder product may have an average particle diameter varying in the range of 0.5–1,000 μm. However, it is easy to form a powder product having an average particle diameter in the range of 0.5–20 μm which is suitable for use in the present invention by controlling the heating temperature in the reaction heating step as described above.

In accordance with the high-purity precursor method, it is possible to obtain a silicon carbide powder of high purity having a content of 1 ppm or less of each harmful atom by using an organic curable compound prepared in the presence of a catalyst free from harmful atoms as component (b) and preferably using a highly pure siliceous material having a content of 1 ppm or less for each harmful atom as component (a).

Part of harmful atoms can be removed by purification including heat treatment and washing, but the ease of removal of metallic impurities depends not only on the particular elements but also on the state of binding and the location of the elements. For example, those metallic elements deposited by mere adhesion or adsorption and having a relatively high vapor pressure are relatively easy to remove by purification. However, it is difficult to remove metallic elements when they are present within individual polycrystalline particles of silicon carbide used as a starting powder. Among others, the concentration of those metallic elements having a relatively low vapor pressure at high temperatures should be as low as possible in the starting silicon carbide powder. For this reason, the starting silicon carbide powder should have a content of 1 ppm or less of each harmful atom.

The maximum acceptable level of 1 ppm of each harmful atom has been determined by various tests which are presently employed to examine contamination of silicon wafers including the lifetime method and the X-ray transmission method. Thus, it has been confirmed that the presence of harmful atoms in a β-silicon carbide powder in an amount of 1 ppm or less does not appreciably contaminate silicon wafers during processing in semiconductor equipment that has been formed from the powder by sintering.

Using the highly pure silicon carbide powder prepared by the high-purity precursor method as a starting material, a silicon carbide sintered body suitable for use in the manufacture of semiconductor equipment is prepared by a process comprising the steps of shaping, calcining to form a porous body, and reaction sintering with molten silicon.

The shaping step may be performed by any technique conventionally employed in powder metallurgy which includes cold isostatic pressing (CIP) and casting. In casting, the starting powder is usually mixed with a deflocculant and a binder in water to form a slurry which is cast into a mold.

The starting silicon carbide powder has an average particle diameter in the range of about 0.5–20 μm and preferably in the range of about 0.7–10 μm. When the average particle diameter is less than about 0.5 μm, a non-uniform shaped body tends to form therefrom, since the powder has a decreased fluidity in the case of CIP or it Forms a slurry having an increased viscosity in the case of casting. On the other hand, a starting powder having an average particle diameter of larger than about 20 μm forms a porous body in the calcining step which has a decreased strength due to a decrease in the total bonded area between adjacent particles and which is difficult to handle in a commercial process.

The starting silicon carbide powder also has a free carbon content of not greater than about 20% and preferably from about 0 to about 10% by weight. The free carbon content can be controlled by varying the proportion of the siliceous component (a) and the carbonaceous component (b). The free carbon preferably distributed in the form of carbon fine particles having a diameter of about 0.01–0.1 µm around the polycrystalline particles of silicon carbide. The distribution of free carbon as such fine particles can be realized by forming a uniform or homogeneous starting mixture in the high-purity precursor method by use of at least one liquid reactant.

During the subsequent calcining step, part of the free carbon present in the starting silicon carbide powder is removed by a reaction with oxygen or the like adsorbed on the powder, while the rest remains in the form of fine carbon particles having a diameter of about 1 µm or less, which are uniformly distributed in the silicon carbide matrix of the resulting porous body and which are reactive with molten silicon to form silicon carbide in the subsequent reaction sintering step. If the free carbon content of the starting silicon carbide powder exceeds about 20% by weight, the carbon remaining after calcination may cause cracking of the resulting sintered body due to expansion in volume occurring in the reaction of free carbon with molten silicon.

Calcining of the shaped body is performed in non-oxidizing conditions, such as a vacuum or in an inert atmosphere using such gases as nitrogen, argon, helium, or a mixture of these. The calcining conditions are selected so as to remove substantially all the volatiles and form a porous body and they depend on the size of the shaped body. Usually calcination is carried out at a temperature in the range of about 500°–2000° C. and preferably about 1000°–2000 ° C. for about 1–10 hours. The porous body formed by calcination has a structure having a matrix phase of porous silicon carbide, which is either free from carbon particles or which contains fine particles of free carbon having an average particle diameter of about 1 µm or less and uniformly distributed in the matrix.

The porous body is then subjected to reaction sintering while being impregnated with molten metallic silicon at a high temperature, thereby forming the desired product of sintered silicon carbide. Preferably, the molten silicon is of high purity, i.e., having an impurity level of 0.1 ppm or less. Purification of silicon to such a degree is relatively easy.

The reaction sintering is preferably performed at a temperature of from about 1450°–1600 ° C. for about 1–10 hours in vacuum or in an inert gas such as argon or helium. A nitrogen atmosphere is not preferable since nitrogen is reactive with molten silicon. The amount of silicon to be impregnated is generally in the range of about 20% –50% by weight based on the total weight of the porous body and the silicon.

In reaction sintering with metallic silicon, the molten silicon serves to react with at least part of the fine free carbon particles remaining in the porous body to form silicon carbide while simultaneously sintering the silicon carbide particles in the matrix. As a result, the resulting sintered body has a structure consisting of a silicon carbide matrix phase, and, optionally a reacted silicon carbide phase formed by a reaction of free carbon and molten silicon and metallic silicon phase which is unreacted, impregnated metallic silicon. When the starting silicon carbide powder has a residual oxygen content of 1% by weight or less, substantially all (i.e., 99% by weight or more) of the free carbon In the porous body is converted into the reacted silicon carbide phase by reaction sintering, so that the resulting sintered body is comprised of about 50–80% by weight of silicon carbide matrix phase, about 0%–30% by weight of reacted silicon carbide phase, and about 0%–40% by weight of metallic silicon phase. A preferable structure consists of about 50%–70% by weight of silicon carbide matrix phase, about 0%–20% by weight of reacted silicon carbide phase, and about 10%–40% by weight of metallic silicon phase.

As described previously, it is preferable to take precautions to prevent incorporation of harmful atoms from the surrounding environment in each step of the process. For example, it is desirable that the surfaces of apparatuses used in the process which contact the silicon carbide be made of or be coated with a harmful atom-free material such as an organic resin free from harmful atoms. Similarly, any materials used in the process such as a deflocculant and a binder used in the shaping step by casting and molten silicon used in the sintering step are preferably as pure as possible, or if incorporation of impurities is unavoidable, the impurities are preferably limited to those readily removable by purification such as heat treatment or washing and the amount thereof should be minimized.

If the starting silicon carbide powder is of high purity, i.e. has a content of 1 ppm or less of each harmful content and the above precaution is taken, it is feasible to produce a silicon carbide sintered body on a commercial scale that contains 1 ppm or less of each harmful atom in all the three phases. If necessary, the porous body or sintered body may be purified by heat treatment in a hydrogen halide gas or by washing with an aqueous 5% ($HF+HNO_3$) solution.

The highly pure silicon carbide sintered body produced by the process of the present invention can be used to manufacture semiconductor equipment by machining, if necessary. The sintered silicon carbide has deformation properties and strength superior to quartz glass at high temperatures above 1000° C. and high strength is maintained up to about 1350° C. Furthermore, substantially no gases harmful to semiconductor devices are generated in such a high temperature region. Therefore, the sintered silicon carbide is suitable for use in the manufacture of semiconductor equipment to be employed at such high temperatures, which includes wafer boats, mother boats, vertical boats, process tubes, liner tubes, and forks.

In the temperature region below 1000° C. down to room temperature, the sintered silicon carbide still exhibits strength superior to commonly used quartz glass and therefore it can be used to manufacture semiconductor equipment such as hands, vacuum chucks, bell jars, spacers, and other securing or positioning instruments.

In view of the high purity of the silicon carbide sintered body produced by the process of the present invention, it is reasonable from an industrial viewpoint to apply the sintered body to the manufacture of semiconductor equipment of the high purity required in processing of wafers having a high integration density.

The following examples are presented to further illustrate the present invention. These examples are to be considered in all respects as illustrative and not restrictive. In the examples, the percents and parts are by weight unless otherwise indicated.

EXAMPLE 1

In this example, ethyl silicate, which is a liquid hydrolyzable silicon compound, and a resol-type phenolic resin containing 65% nonvolatiles, which is a liquid carbonaceous material, were used to form a starting mixture to be used in the preparation of a starting silicon carbide powder. The ethyl silicate comprised 40% $SiO_2$ based on the total weight of the compound and was substantially free from harmful atoms. The phenolic resin was prepared by reacting pure phenol and formaldehyde in a conventional manner except that triethylamine was used as a catalyst.

Sixty-two (62) parts of ethyl silicate were uniformly mixed with 38 parts of the phenolic resin, and then 16 parts of an aqueous 33% p-toluenesulfonic acid solution which was substantially free from harmful atoms were added to the mixture and thoroughly stirred to give a homogeneous starting mixture. The starting mixture was allowed to stand shown in Table 1. The impurity level shown in Table 1 is the sum of the impurity contents in the three phases.

COMPARATIVE EXAMPLE 1

For comparison, a commercially available pure silicon carbide powder (indicated as SiC powder B) was used to perform the shaping, calcining, and reaction sintering steps in the same manner as described in Example 1 to form a silicon carbide sintered body (indicated as sintered Sic B). The impurity levels of the starting silicon carbide powder and the sintered body determined in the same manner as in Example 1 are also shown in Table 1.

TABLE 1

| Sample* | Harmful Impurity Atoms | | | | | | | | | |
|---|---|---|---|---|---|---|---|---|---|---|
| | Na | K | Ca | B | Fe | Ni | Cu | Cr | V | W |
| SiC Powder A | <1 | <1 | <1 | <1 | <1 | <1 | <1 | <1 | <1 | <1 |
| SiC Powder B | 4 | <1 | <1 | <1 | 5 | <1 | <1 | <1 | 5 | 2 |
| Sintered SiC A | <1 | <1 | <1 | <1 | <1 | <1 | <1 | <1 | <1 | <1 |
| Sintered SiC B | <1 | <1 | <1 | <1 | 2 | <1 | <1 | <1 | 3 | 2 |

*A: present invention;
B: comparative example at room temperature for about 30 minutes until the phenolic resin was cured to give a solid body. The resulting reside-like cured body was placed in an electric furnace and preheated to 1000° C. at a rate of 10 ° C./min in a nitrogen atmosphere to give a volatile-free heat-treated body, which was a dense, homogeneous solid having a C/Si ratio of about 3, which was estimated on the basis of the degree of carbon retention after the heat treatment. The heat-treated body was then heated to 1800° at a rate of 10 ° C./min in an argon atmosphere within the same electric furnace and kept at that temperature for 30 minutes to react and form silicon carbide. Thereafter, the temperature was allowed to decrease to 1600° C. and kept at that temperature for an additional 4 hours. After the resulting powder product was allowed to cool to room temperature, it was removed from the electric furnace. The resulting silicon carbide powder was found to be comprised substantially solely of β-silicon carbide as measured by powder X-ray diffraction analysis and had an average particle diameter of about 5 µm and a free carbon content of 10%. The impurity level of the silicon carbide powder product (indicated as SiC powder A) determined by radioactivation analysis and atomic absorption analysis is shown in Table 1.

Sixty (60) parts of the silicon carbide powder A was mixed with 3 parts of ammonium polycarboxylate as a deflocculant, 3 parts of an aqueous acrylic emulsion as a binder, and 24 parts of water to form a slurry. The slurry was cast into a mold and the resulting shaped body was calcined in vacuum at 1000° C. for 3 hours to form a porous body, which had a structure having a matrix of porous silicon carbide in which fine particles of free carbon of not greater than 3 µm (average particle diameter: about 0.1 µm) are uniformly dispersed. The porous body was subjected to reaction sintering at 1500° C. while it was impregnated over 1 hour with molten pure silicon (having a tennine purity) in an amount of 30% based on the total weight to form a sintered body. The resulting silicon carbide sintered body (indicated as sintered SiC A) consisted of 56% of silicon carbide matrix phase, 18% of reacted silicon carbide phase, and 26% of metallic silicon phase. The impurity level of the silicon carbide sintered body determined as above is also As is apparent from the results shown in Table 1, the use as a carbonaceous material of a phenolic resin having a content of 1 ppm or less of each harmful atom which had been prepared in the presence of a catalyst free from harmful atoms in accordance with the present invention resulted in the formation of a silicon carbide powder of high purity having a content of 1 ppm or less of each harmful atom. Furthermore, the use of the high purity silicon carbide powder to prepare a sintered silicon carbide by shaping, calcining, and reaction sintering with molten pure silicon gave a sintered body of high purity having a content of 1 ppm or less of each harmful atom.

In contrast, a commercially available pure silicon carbide contained at least one harmful atom in an amount exceeding 1 ppm and the resulting sintered body formed therefrom also had a content of at least one harmful atom in excess of 1 ppm and the quality of the sintered body was no longer suitable for use in the manufacture of semiconductor equipment.

I will be appreciated by those skilled in the art that numerous variations and modifications may be made to the invention as described above with respect to specific embodiments without departing from the spirit or scope of the invention as broadly described.

What is claimed is:

1. A process for preparing a silicon carbide sintered body suitable for use in manufacture of semiconductor equipment comprising steps of shaping a silicon carbide powder to form a shaped body, calcining the shaped body in a non-oxidizing atmosphere to form a porous body, and subjecting the porous body to reaction sintering while being impregnated with molten silicon, wherein the silicon carbide powder consists essentially of β-SiC and has an average particle diameter of about 0.5–20 µm, a free carbon content of not greater than about 20% by weight, and a content of 1 ppm or less of each of alkali metal, alkaline earth metal, B, Al, Ga and heavy metal atoms, and wherein the silicon carbide powder is prepared by a method which comprises preparing a carbon- and silicon- containing starting mixture comprising (a) at least one siliceous material selected from liquid hydrolyzable silicon compounds and solid siliceous substances derived from a hydrolyzable silicon compound, and (b) at least one carbonaceous material selected from polymerizable or cross-linkable organic compounds prepared in the presence of a catalyst which is substantially free of each of alkali metal, alkaline earth metal, B, Al, Ga and heavy metal atoms, at least one material used as component (a) or (b) being a liquid substance, solidifying the starting mixture by heating, by use of a catalyst or a curing agent, or by a combination thereof to form a solid body, and forming the silicon carbide powder by heating the solid body at a temperature of from about 1600° C. to about 2000° C. in a non-oxidizing atmosphere.

2. The process according to claim 1, wherein the solid body obtained in the solidifying step is subjected to heat treatment, prior to heating, under conditions sufficient to remove volatiles from the solid body.

3. The process according to claim 1, wherein all components constituting the starting mixture have a content of 1 ppm or less of each of alkali metal, alkaline earth metal, B, Al, Ga, and heavy metal atoms and all of the components are in a liquid state.

4. The process according to claim 1, wherein the liquid hydrolyzable silicon compound is selected from (1) polymers prepared by tri-methylation of a hydrolyzable silicic acid derivative and (2) esters prepared by a reaction of a hydrolyzable silicic acid derivative with a monohydric alcohol or a polyhydric alcohol.

5. The process according to claim 4, wherein the liquid hydrolyzable silicon compound is an alkyl silicate.

6. The process according to claim 1, wherein the carbonaceous material is selected from thermosetting resins including phenolic resin, furan resins, urea resins, epoxy resins, unsaturated polyester resins, polyimide resins, and polyurethane resins.

7. The process according to claim 6, wherein the carbonaceous material is a phenolic resin.

8. The process according to claim 7, wherein the phenolic resin is a resol resin prepared in the presence of ammonia or an amine as a catalyst.

9. The process according to claim 7, wherein the phenolic resin is a novolak resin prepared in the presence of an inorganic or organic acid.

10. The process according to claim 1, wherein the starting mixture further comprises a polymerization or curing catalyst or a cross-linking agent.

11. The process according to claim 1, wherein proportions of the siliceous and carbonaceous materials in the starting mixture are such that an atomic ratio of C/Si is between 1 and 10 for a sample of the starting mixture which has been cured and heat-treated at a temperature in the range of 800°–1400° C. to remove volatiles.

12. The process according to claim 1, wherein the silicon carbide sintered body formed by the reaction sintering step has a structure consisting of about 50%–80% by weight of silicon carbide matrix phase, about 0%–30% by weight of reacted silicon carbide phase, and about 0%–40% by weight of silicon phase and each of the phases has a content of 1 ppm or less of each of alkali metal, alkaline earth metal, B, Al, Ga and heavy metal atoms.

13. The process according to claim 12, wherein the structure consists of about 50%–70% by weight of silicon carbide matrix phase, about 0%–20% by weight of reacted silicon carbide phase, and about 10%–40% by weight of silicon phase.

14. The process according to claim 1, wherein the silicon carbide powder has a free carbon content of not greater than about 10% by weight.

15. The process according to claim 1, wherein the calcining step is performed at a temperature between about 500° C. and about 2000° C. for 1–10 hours.

16. The process according to claim 1, wherein the reaction sintering is performed at a temperature between about 1450° C. and about 1600° C. for 1–10 hours.

17. The process according to claim 1, wherein an amount of molten silicon impregnated in the reaction sintering step is between about 20% and about 50% by weight, based on a total weight of the porous body and the silicon.

18. The process according to claim 1, wherein the molten silicon used in the reaction sintering step has an impurity content of less than 0.1 ppm.

19. The process according to claim 1, wherein the β-SiC powder contains less than 1% alpha-silicon carbide.

20. The process according to claim 1, wherein the β-SiC powder has an average particle diameter of 0.5–100 μm.

21. The process according to claim 1, wherein the β-SiC powder has <1 ppm Fe, <1 ppm Ni, <1 ppm Cu, <1 ppm Cr, <1 ppm V, <1 ppm Na, <1 ppm K, <1 ppm B and <1 ppm Mg.

22. A process for preparation of a silicon carbide sintered body suitable for use in manufacture of semiconductor equipment comprising steps of shaping a silicon carbide powder into a shaped body, calcining the shaped body in a non-oxidizing atmosphere to form a porous body, and subjecting the porous body to reaction sintering while being impregnated with molten silicon, wherein the silicon carbide powder is unpulverized and has an average particle diameter of about 0.5–20 μm, a free carbon content of not greater than about 20% by weight, and a content of 1 ppm or less of each of alkali metal, alkaline earth metal, B, Al, Ga, and heavy metal atoms, the silicon carbide powder being prepared by a method which comprises preparing a carbon- and silicon- containing starting mixture comprising (a) at least one siliceous material selected from liquid hydrolyzable silicon compounds and solid siliceous substances derived from a hydrolyzable silicon compound, and (b) at least one carbonaceous material selected from polymerizable or cross-linkable organic compounds prepared in the presence of a catalyst which is substantially free from each of alkali metal, alkaline earth metal, B, Al, Ga, and heavy metal atoms, at least one material used as component (a) or (b) being a liquid substance; solidifying the starting mixture into a solid body by heating,, by use of a catalyst or a curing agent, or by a combination thereof; and heating the solid body in a non-oxidizing .atmosphere at a temperature sufficient to produce the silicon carbide powder.

23. The process according to claim 22, wherein the heating is performed at a temperature of from about 1600° C. to about 2000° C.

24. The process according to claim 22, wherein the silicon carbide powder is β-SiC powder containing less than 1% alpha-silicon carbide powder.

* * * * *

UNITED STATES PATENT AND TRADEMARK OFFICE
CERTIFICATE OF CORRECTION

PATENT NO. : 5,589,116

DATED : December 31, 1996

INVENTOR(S) : Shoichi KOJIMA et al

It is certified that error appears in the above-indentified patent and that said Letters Patent is hereby corrected as shown below:

```
Title page
```
In Section [73], add -- and BRIDGESTONE CORPORATION, Tokyo, Japan --.

Signed and Sealed this

Sixth Day of May, 1997

*Attest:*

BRUCE LEHMAN

*Attesting Officer*     *Commissioner of Patents and Trademarks*